Dec. 15, 1931.  S. GREENHOUSE  1,836,796
BOTTLE FILLING MACHINE
Filed July 29, 1925  3 Sheets-Sheet 1

Samuel Greenhouse INVENTOR
BY F. E. Shannon
ATTORNEY

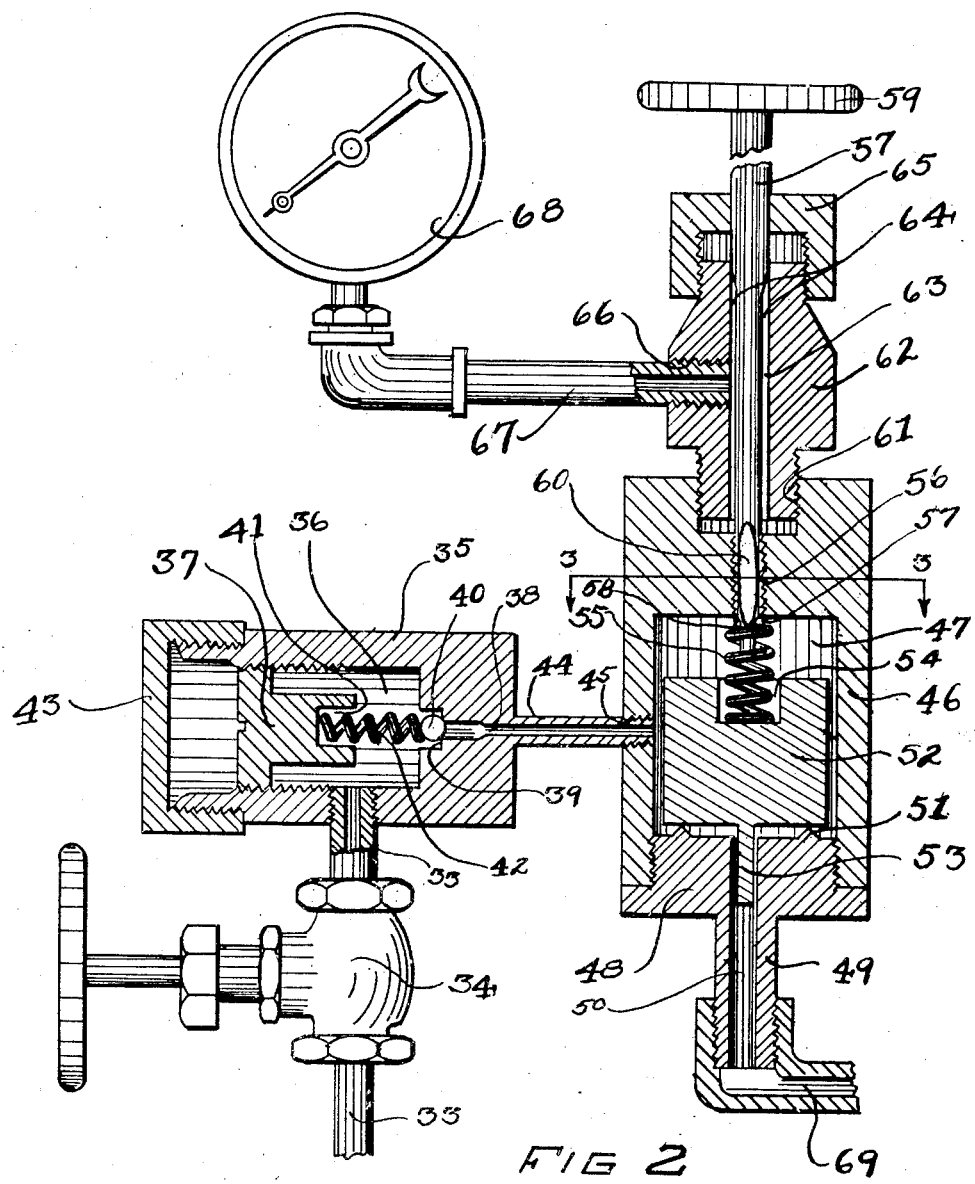
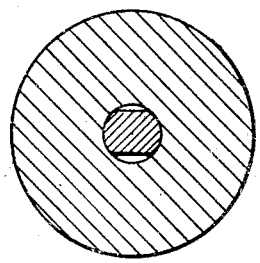
FIG 2
FIG 3

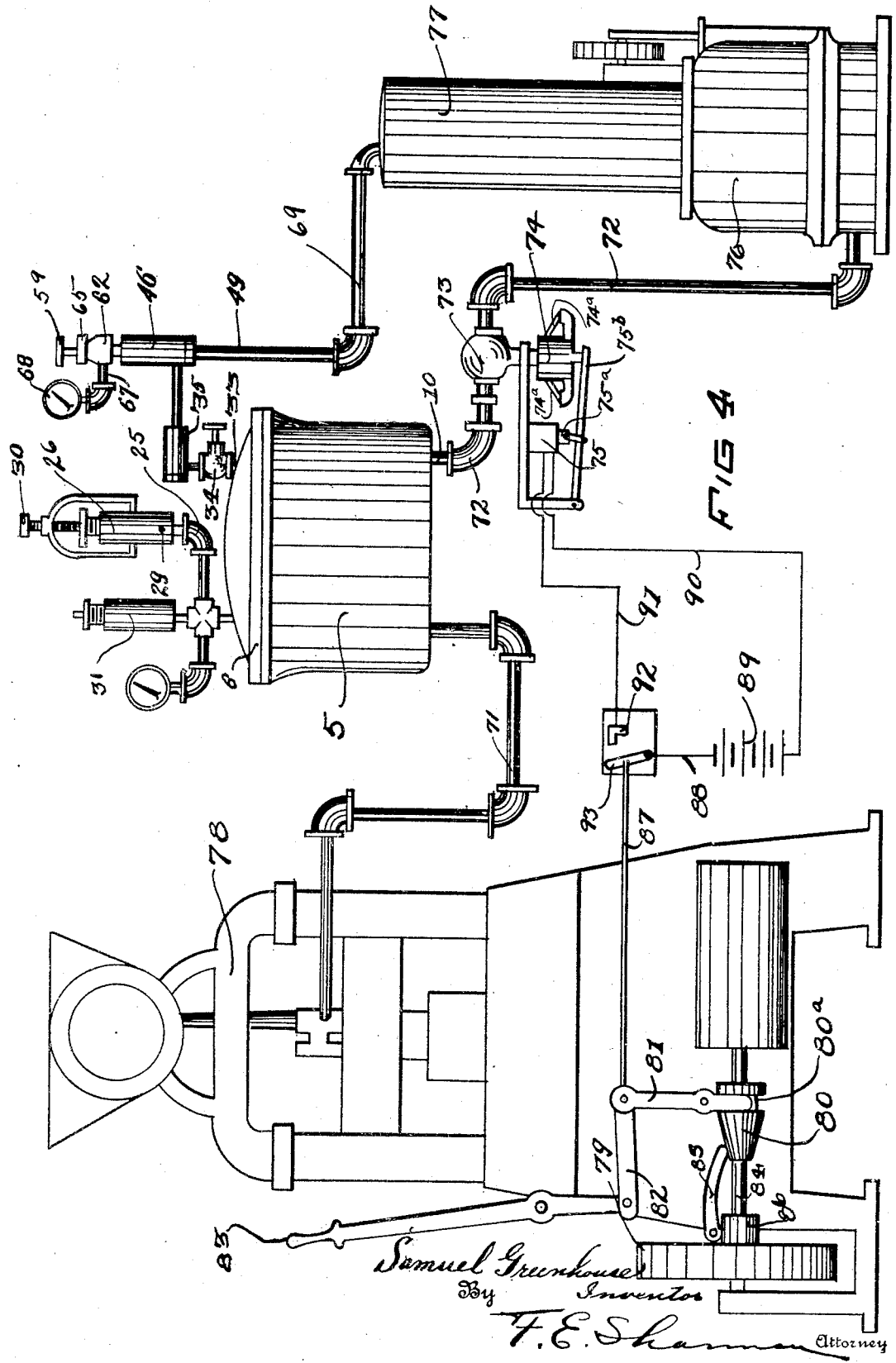

Patented Dec. 15, 1931

1,836,796

UNITED STATES PATENT OFFICE

SAMUEL GREENHOUSE, OF AKRON, OHIO

BOTTLE FILLING MACHINE

Application filed July 29, 1925. Serial No. 46,791.

This invention relates to improvements in the art of bottling and to new and useful improvements in bottle filling machines.

The invention is particularly adapted for use in bottling beverages containing carbon dioxide gas under pressure. In bottling such beverages with ordinary apparatus, the liquid absorbs and holds a relatively large percentage of free air, resulting in the loss of a considerable amount of the carbon dioxide gas and as a result the liquid when bottled does not contain a sufficient amount of carbonic acid gas to preserve it. The presence of air in a bottled product results in fermentation; this is particularly true of liquids flavored and sweetened with vegetable matter. It is also well known that liquid, containing air and carbon dioxide gas under pressure, will lose both the air and gas in a relatively short time after the bottle has been opened, resulting in a flat, undesirable beverage.

It is therefore an object of this invention to provide a method of bottling whereby the free air is eliminated and the liquid is placed in bottles fully charged with carbon dioxide gas.

Further objects of the invention are to provide a bottling machine which will eliminate the free air from a liquid charged with carbonic acid gas under pressure and which will prevent the liquid from absorbing free air during the bottling operation and which will cause the liquid to absorb an additional amount of carbon dioxide gas during the bottling process and to thereby provide a highly efficient means which in use will produce a deaerated beverage containing a maximum amount of carbon dioxide gas.

A particular object is to provide an enclosed chamber arranged to hold a quantity of liquid charged with carbonic acid gas; to provide means for introducing the beverage directly from its source to said tank; to provide means for breaking the liquid into a fine spray within an enclosed chamber as it is so introduced; to provide means for maintaining the liquid to a certain level in said chamber; to provide ventilating means for permitting the air and lighter gases to continuously escape from the upper portion of said chamber during the bottling operation; to provide means for maintaining a certain predetermined pressure in said chamber during the bottling operation and to so arrange and combine said means whereby the same will co-act to produce a product heavily charged with carbon dioxide gas.

In what is commonly known as high pressure bottling machines, the liquid is forced into the bottles at an exceedingly high pressure, in order to charge the same with the proper quantity of carbon dioxide gas. In using this high pressure, a relatively high percentage of the bottles are broken resulting in a considerable loss and rendering the bottling operation exceedingly dangerous.

It is therefore an object of this invention to provide a new and improved method of bottling and a new and improved means whereby the ordinary high pressure bottling machines may be operated with approximately half the usual pressure to produce a product containing the same or a greater percentage of carbon dioxide gas as when bottled by ordinary methods at a high pressure.

The invention provides certain improvements in the invention disclosed in United States Letters Patent, Numbered 1,686,811, bearing date, October 9, 1928, and aims to provide in combination with some of the elements and devices therein shown and described, certain new elements and parts arranged to co-act to provide a deaerated beverage containing a relatively high percentage of carbonic acid gas.

The above objects are accomplished and additional ends are attained by the new and improved method herein described and by the novel combination and arrangement of parts hereinafter described and illustrated in the accompanying drawings, it being understood that the invention is capable of various adaptations and that changes and variations may be made or resort had to substitutions which come within the spirit of the invention as hereinafter described and set forth in the appended claims.

In the drawings, like numerals of reference are employed to designate like parts as the same may appear in any of the several views and in which:—

Figure 2 is a central, vertical, sectional view of a new and novel means for maintaining a fluid within a tank at a certain predetermined pressure.

Figure 3 is a cross sectional view taken as indicated by the line 3—3 of Figure 2.

Figure 4 is an elevational view of a "high pressure" bottling machine and of a carbonator, the same being illustrated with a device constructed in accordance with this invention, operatively interposed therebetween.

Figure 1:
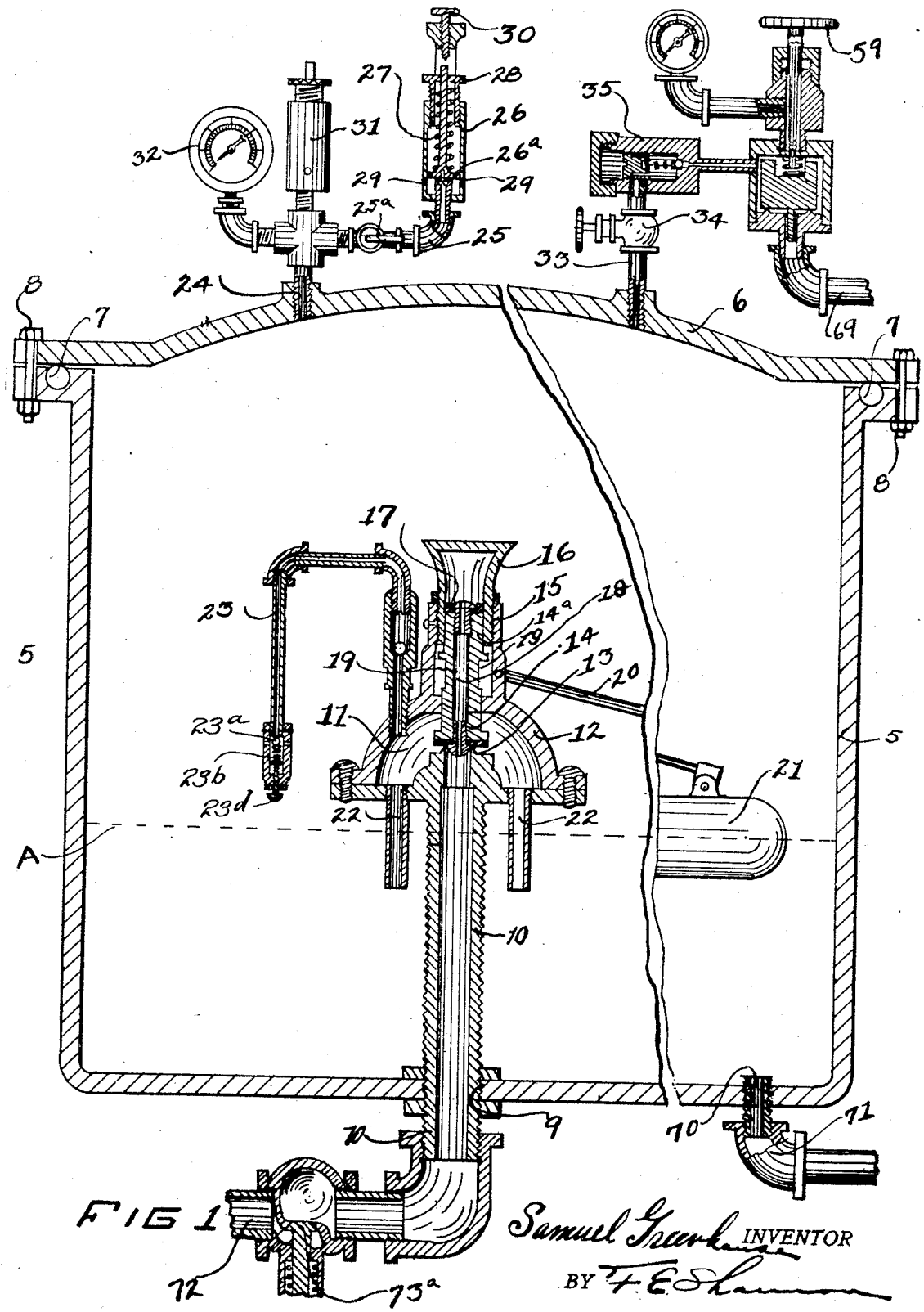
Figure 1 is a vertical, sectional view of a device constructed in accordance with this invention.

The invention will now be described in detail, with reference to the particular adaptation thereof disclosed in the drawings. I have shown an enclosed tank adapted to hold fluid under pressure. In the form of the invention illustrated, the tank is separated from the bottling machine and is particularly adapted for use with a "high pressure" bottling machine, but may be used to equal advantage in any system of bottling and in connection with any type of bottling machine.

In carrying out the invention, I employ a tank, means to maintain liquid at a certain level in said tank. I also provide a pressure operable vent arranged to permit a constant escape of air from the upper part of the chamber such as is described in United States Letters Patent Numbered 1,656,670, granted January 17, 1928 and I further provide new and improved means for maintaining a certain pressure in the upper part of the tank.

In the drawings, the numeral 5 is used to denote a tank which is provided with a lid 6. A suitable gasket 7 is positioned between the lid and the upper edge of the tank 5 and the lid is secured in place by means of the bolts 8 or other suitable fastening means. The tank 5 is provided in the bottom thereof with a bore 9 in which is mounted an inlet pipe 10. The inlet pipe 10 projects upwardly from the bottom thereof and terminates within the chamber 11 formed by the enclosed casing 12. The pipe 10 is provided at the upper end thereof with a valve seat 13 and the valve 14 is operatively mounted thereon. The casing 12 is provided with a tubular portion 15 in which is mounted the valve stem 14a. The tubular portion 15 is internally threaded at the upper end thereof and a hollow screw plug 16 is operatively mounted therein. The valve stem 14a is arranged to fit within the cavity of the plug 16 and is provided at the upper end thereof with a suitable packing 17. The stem 14a is provided with an axial bore 18 which extends therethrough and communicates with the cavity in the plug 16 and the bore of the pipe 10 whereby liquid under pressure when introduced through the pipe 10 will be delivered through the bore 18 to the cavity in said cap thereby equalizing the pressure on the valve 14. The valve stem 14a is provided at a point intermediate its length with a suitable groove 19 which is arranged to receive the inwardly projecting end (not shown) of the lever 20 which is fulcrumed on the tubular extension 15. The lever 20 is provided at the outer end thereof with a float 21 whereby the valve 14 will be closed when the fluid reaches a certain level in said tank.

The numeral 22 denotes tubes which communicate with the chamber 11 and extend downwardly from the casing 12 to a plane below the desired level of the liquid within the tank. The numeral 23 denotes a vent tube which is secured in the walls of the casing 12 so as to communicate with the chamber 11. The vent tube 23 is provided at the end thereof with a spring operated valve 23a which may be regulated by operating the screw 23d, thereby providing for a compression of the spring 23b which will permit fluid to escape from the chamber 11 after it has reached a certain predetermined pressure. The lid 6 is provided with a suitable opening 24 in which is mounted a tube 25 leading to a venting device 26. The venting device 26 is fully described in United States Letters Patent Numbered 1,656,670, granted January 17, 1928, and comprises a valve 26a which controls the opening in said tube 25. The valve is normally held in a closed position by means of the spring 27 which may be regulated by a screw plug 28 whereby air or gas under pressure within the tank will constantly escape through the openings 29 as long as the pressure is maintained at or above a certain point. The venting device is provided with a stop screw 30 which may be set to limit the upward movement of the valve 26a so that the fluid under pressure will escape slowly from said venting device 26. The vent 26 is designed to permit a constant escape of gas at a bottling pressure.

The numeral 31 is used to denote a safety valve which is arranged to operate at a pressure higher than the pressure which will operate the venting device 26. The safety valve 31 is not ordinarily used and is provided to furnish a release of pressure should the venting device fail to operate, or to release the pressure within the tank if for any reason it becomes too great. The numeral 32 denotes a pressure gauge which is also operatively interposed in the line 25 so as to communicate with the chamber of the tank 5. The lid is also provided with an inlet opening in which is mounted a tube 33. The tube is provided with a suitable valve 34 which may be used to close said tube or regulate the opening therethrough.

The numeral 35 denotes a cylindrical casing having a threaded opening in one side thereof to receive the upper threaded end of the pipe 33. The cylindrical casing 35 is provided with a cylindrical cavity 36 which extends therein from one end thereof. The casing is interiorly threaded and a screw plug 37 is operatively mounted therein. The numeral 38 denotes an axial bore which extends through the closed end of the casing 35. The inner wall of the casing 35 is provided with a valve seat 39 in which is mounted a ball 40. The plug 37 is provided at the inner end thereof with a cavity 41 which is adapted to receive one end of the coil spring 42, the other end of the spring bearing against the ball 40 and normally holding it in a closed position in the valve seat 39. The casing 35 is provided with a suitable lid 43 which is threaded or otherwise suitably secured thereon.

The numeral 44 denotes a tube which projects coaxially from the casing 36 with the bore 38 extending therethrough. The outwardly projecting end of the tube 44 is threaded and is operatively mounted in a suitably threaded bore 45 which is formed in the side of the casing 46. The casing 46 is provided with a cylindrical cavity 47 which communicates with the opening 38 in the tube 44. The casing 46 is interiorly threaded at the lower end thereof and a base plug 48 is operatively mounted therein. The base plug 48 is provided with an axially arranged tubular projection 49 having a bore 50 extending therethrough and communicating with the chamber 47. The numeral 51 denotes a valve seat which projects upwardly from the plug 48 and the numeral 52 denotes a valve in the form of a weight which is positioned on the valve seat 51. The valve 52 is provided on the lower end thereof with downwardly projecting axially arranged pin 53 which is of smaller diameter than the bore 50 and which is slidably mounted therein. The weight 52 is provided in the upper wall thereof with an axial cavity 54 which is arranged to receive the lower end of a coil spring 55. The casing 46 is provided on the upper wall thereof with a threaded bore 56 in which is mounted a screw stem 57. The lower end of the stem is positioned in the coil spring 55 and is provided with a shoulder 58 which bears against the upper end of the spring 55. The portion of the stem 57 which extends through the bore 56, is flattened as at 60 along one side thereof to provide an opening whereby fluid under pressure when introduced to the cavity 47 may escape around said stem. The bore 56 is enlarged at the upper end thereof to provide a threaded seat 61 in which is mounted a suitable plug 62. The plug 62 is provided with an axial bore 63 which extends therethrough and the stem 57 is cut away as at 64 to provide for the passage of fluid through said bore.

The numeral 65 denotes a cap which is secured to the upper end of the plug 62 so as to form a fluid tight closure at the upper end of said plug 62. The plug 62 is provided on one side thereof with a threaded opening 66 which communicates with the bore 63 and in which is mounted the tube 67 and a pressure gauge 68 is operatively mounted on said tube. The numeral 69 denotes a tube which is operatively secured to the end of the tubular extension 49. The other end of the tube 69 leads to a supply of carbon dioxide gas under pressure. The tank is provided on the lower wall thereof with a threaded opening 70 in which is mounted an outlet tube 71.

The inlet tube 10 is operatively connected to a conduit 72 leading to a carbonator 76 or other means for supplying a liquid charged with carbonic acid gas under pressure.

The numeral 73 denotes a valve which is positioned in the conduit 72. While the valve 73 may be of any suitable construction, I prefer to use and have shown an automatically operable valve such as shown and described in my pending application Serial Number 46,790, filed July 29, 1925. This valve includes valve mechanism 74 which when raised operates the valve arms 74a and raises the valve head 73a, thus opening the valve 73 and permitting liquid to flow from the carbonator 76 to the tank 5.

The numeral 75 denotes a solenoid which is provided with a movable core 75a which is operatively attached to the lever 75b, the free end of the lever operating against the member 74, whereby the solenoid will raise said lever and open said valve. The valve mechanism 74 is arranged to normally hold the valve 73 in a closed position whereby the valve is open only during the operation of the solenoid 75. The tube 69 is operatively connected to a tank 77 containing carbon dioxide gas under pressure. In the drawings, I have shown a tank 77 which is operatively connected with the carbonator 76. It is understood that a separate tank or other source of supply of carbon dioxide gas under pressure may be used if desired. The conduit 71 leads directly to a bottling machine 78. The bottling machine 78 may be of any desired construction. In the drawings I have shown a drive shaft 84 on which is mounted a drive wheel 79. The drive wheel 79 is provided with a clutch 86 which is operated by means of the lever 85. A cone 80 is slidably mounted on the shaft 84 whereby a movement of the cone 80 toward the wheel 79 will cause a raising movement of the lever 85, thus operating the clutch 86 and locking the wheel on the shaft 84. The sliding movement of the cone 80 is controlled by means of a lever 81. The lower end of the lever 81 is entered in an annular groove 80a in said cone; the upper end of the lever 81 being connected by means of a strap 82 to a hand lever 83 which is used to operate the clutch 86. The numeral 87 denotes a rod or other means for connecting the lever 81 with the switch blade 93 on the switch 92. The blade 93 of the switch 92 is connected by a suitable conductor 88 to a source of electric power 89. The other pole of said source being connected by means of the conductor 90 to a solenoid 75. The other terminal of the solenoid 75 is connected by means of the conductor wire 91 to the other terminal of the switch 92.

In use, the handles 74a are operated upwardly to open the valve 73 and permit water to flow from the carbonator 76 to the tank 5. Inasmuch as the float 21 is in a downward position, the liquid flows into the tank until it reaches a level indicated by the dotted line A of Figure 1 whereupon the levers 74a are operated downwardly to close said valve. As soon as the gauge 32 indicates that the pressure within the tank has reached the proper pressure for bottling, the valve 25a is opened and the venting device 26 is set to provide a constant vent at a bottling pressure. The valve 34 is opened and the stem 57 is operated to compress the spring and provide the proper pressure on the weight whereby carbon dioxide gas will flow through the tube 69 and through the chambers 47 and 36, to the tank 5, whenever the pressure within the tank reaches a point below a bottling pressure. It will thus be seen that means is provided for a constant escape from the venting device 26 and that positive means is provided for maintaining the pressure at a point which will cause said venting device 26 to operate continually. It being determined that the proper amount of liquid is within the tank and that the fluid pressure is correct, the lever 83 is operated to engage the clutch 86, thus starting the bottling machine in operation. As the lever 83 is operated, the switch 92 is closed, thus closing the circuit and causing the solenoid 75 to operate the mechanism 74 and operating the valve 73.

Inasmuch as the liquid is being continuously drawn from the tank 5, the valve 14 will remain in a partly open position, causing the liquid to be delivered to the chamber 11 in a fine spray. Inasmuch as the liquid is heavily charged with carbonic acid gas under pressure and inasmuch as the carbonic acid gas is much heavier than the free air in the liquid, the air and other lighter gases will separate from the carbonic acid gas and escape through the tube 23 to the chamber of the tank 5 and the liquid heavily charged with carbonic acid gas will flow downwardly to the tube 22 to replenish the liquid drawn from the tank. Inasmuch as the vent 26 is in constant operation the carbonic acid gas and air and other lighter gases will stratify; the air and lighter gases rising to the top and being expelled through the opening 29 of the venting device 26.

It will be seen that while the valve 14 is operated by the float 21 that the constant delivery of the fluid from the tank to the bottling machine will keep the valve 14 in a partly closed position and that the said float 21 will operate to maintain the fluid in the tank 5 at a level marked by the dotted line A.

As soon as the operation of the bottling machine is stopped by a movement of the lever 83, the switch 92 will be operated, thus opening the electrical circuit and releasing the mechanism 74 from the operation of the solenoid 75. Inasmuch as the valve 73 is arranged to be normally closed by the mechanism 74, the said valve 73 will stop the flow of liquid from the carbonator 76 to the tank 5, as soon as the operation of the bottling machine is discontinued. It will also be seen that when the operation of the machine is thus stopped that the height of the liquid within the chamber will not rise, although the valve 14 is partly in an open position.

While I have shown and described a valve 73 operated with a solenoid 75, it is to be understood that any suitable form of valve may be employed and that fluid pressure or other means which may be connected for automatic operation with a bottling machine may be used. And while I have shown means associated with the clutch of a bottling machine for operating said valve, the same may be connected to other parts of the bottling machine or the solenoid operatively interposed in an electric circuit driving a motor (not shown) used to provide power for operating the machine.

It will thus be seen that I have provided positive means for maintaining liquid at a certain height within the tank 5 and that I have provided positive means for maintaining fluid pressure within said tank at a bottling pressure.

Having thus illustrated my invention and described the same in detail, what I claim as new and desire to secure by Letters Patent is:—

1. In a device for removing free air and undesirable gases from a liquid charged with carbon dioxide gas, a closed tank adapted to hold liquid under pressure, an inlet tube extending into said tank, said inlet tube provided on the inner end thereof with an enclosed casing, a check controlled pressure operable vent on said casing, a valve adapted to control flow of liquid from said tube to said casing; a float arranged to automatically operate said valve; outlet tubes leading downwardly from said casing, a regulatable pressure operated vent in the upper wall of said tank, said vent adapted to operate at a bottling pressure and pressure operable means to maintain the fluid in said tank at a bottling pressure.

2. In a device for removing free air and undesirable gases from a liquid charged with carbon dioxide gas, a closed tank adapted to hold fluid under pressure, an inlet tube extending into said tank, a valve on said tube, said inlet tube provided on the inner end thereof with an enclosed casing, a check controlled pressure operable vent on said casing, a spray valve adapted to control the flow of liquid from said tube to said casing, a float arranged to automatically operate said valve, an outlet from said casing to said tank, a regulatable pressure operated vent in the upper wall of said tank, said vent adapted to continuously operate at a bottling pressure and pressure operable means to maintain the fluid in said tank at a bottling pressure.

3. In a device for removing free air and undesirable gases from a liquid charged with carbon dioxide gas, a closed tank adapted to hold fluid under pressure, an inlet tube extending into said tank, said inlet tube provided on the inner end thereof with an enclosed casing, a check controlled pressure operable vent on said casing, said vent emptying within said tank, a spray valve regulating the opening from said tube to said casing; means to automatically regulate said valve, outlets leading from said casing, a vent in the upper wall of said tank, said vent adapted to operate at a bottling pressure and pressure operable means to maintain the fluid in said tank at a bottling pressure.

4. In a device of the class described, in combination with an enclosed tank, a pressure operable vent, means to regulate said vent to operate at a bottling pressure, a tube communicating with the upper portion of said tank, a chamber on the upper end of said tube, said chamber provided with an inlet opening, a ball valve controlling said inlet opening, a spring holding said ball valve in a closed position against said inlet opening, means to regulate the pressure of said spring, a tube communicating with said inlet opening, a casing, said tube leading from said casing, a pipe leading from a source of carbon dioxide gas to said casing, a valve within said casing, the last named valve controlling the inlet from said pipe thereto, a spring bearing against the last named valve and a screw operable to regulate the pressure of said spring against said last named valve.

In testimony whereof I have hereunto set my hand.

SAMUEL GREENHOUSE.